(No Model.) 6 Sheets—Sheet 1.

G. H. DICKERMAN.
MACHINE FOR CUTTING STRAW BOARD FOR PAPER BOXES.

No. 297,576. Patented Apr. 29, 1884.

Witnesses:
Walter E. Lombard
C. H. Dodd

Inventor:
George H. Dickerman,
by N. C. Lombard
Attorney.

(No Model.) 6 Sheets—Sheet 2.

G. H. DICKERMAN.
MACHINE FOR CUTTING STRAW BOARD FOR PAPER BOXES.

No. 297,576. Patented Apr. 29, 1884.

Witnesses:
Walter E. Lombard
Charles H. Dodd

Inventor:
George H. Dickerman,
by N. C. Lombard
Attorney.

(No Model.) 6 Sheets—Sheet 5.
G. H. DICKERMAN.
MACHINE FOR CUTTING STRAW BOARD FOR PAPER BOXES.
No. 297,576. Patented Apr. 29, 1884.

Witnesses:
Walter E. Lombard.
Charles H. Dodd.

Inventor:
George H. Dickerman,
by N. C. Lombard
Attorney.

(No Model.) 6 Sheets—Sheet 6.

G. H. DICKERMAN.
MACHINE FOR CUTTING STRAW BOARD FOR PAPER BOXES.

No. 297,576. Patented Apr. 29, 1884.

Witnesses:
Walter E. Lombard.
F. T. Tasker

Inventor:
George H. Dickerman,
by N. C. Lombard
Attorney.

UNITED STATES PATENT OFFICE.

GEORGE H. DICKERMAN, OF SOMERVILLE, MASSACHUSETTS.

MACHINE FOR CUTTING STRAW-BOARD FOR PAPER BOXES.

SPECIFICATION forming part of Letters Patent No. 297,576, dated April 29, 1884.

Application filed June 9, 1883. (No model.)

*To all whom it may concern:*

Be it known that I, GEORGE H. DICKERMAN, of Somerville, in the county of Middlesex and State of Massachusetts, have invented certain new and useful Improvements in Machines for Cutting Straw-Board for Paper Boxes, of which the following, taken in connection with the accompanying drawings, is a specification.

My invention relates to a machine for cutting blanks from straw-board for making paper boxes; and it consists in certain novel features of construction and combinations and arrangements of parts, which will be best understood by reference to the description of the drawings and to the claims to be hereinafter given.

Figure 1:
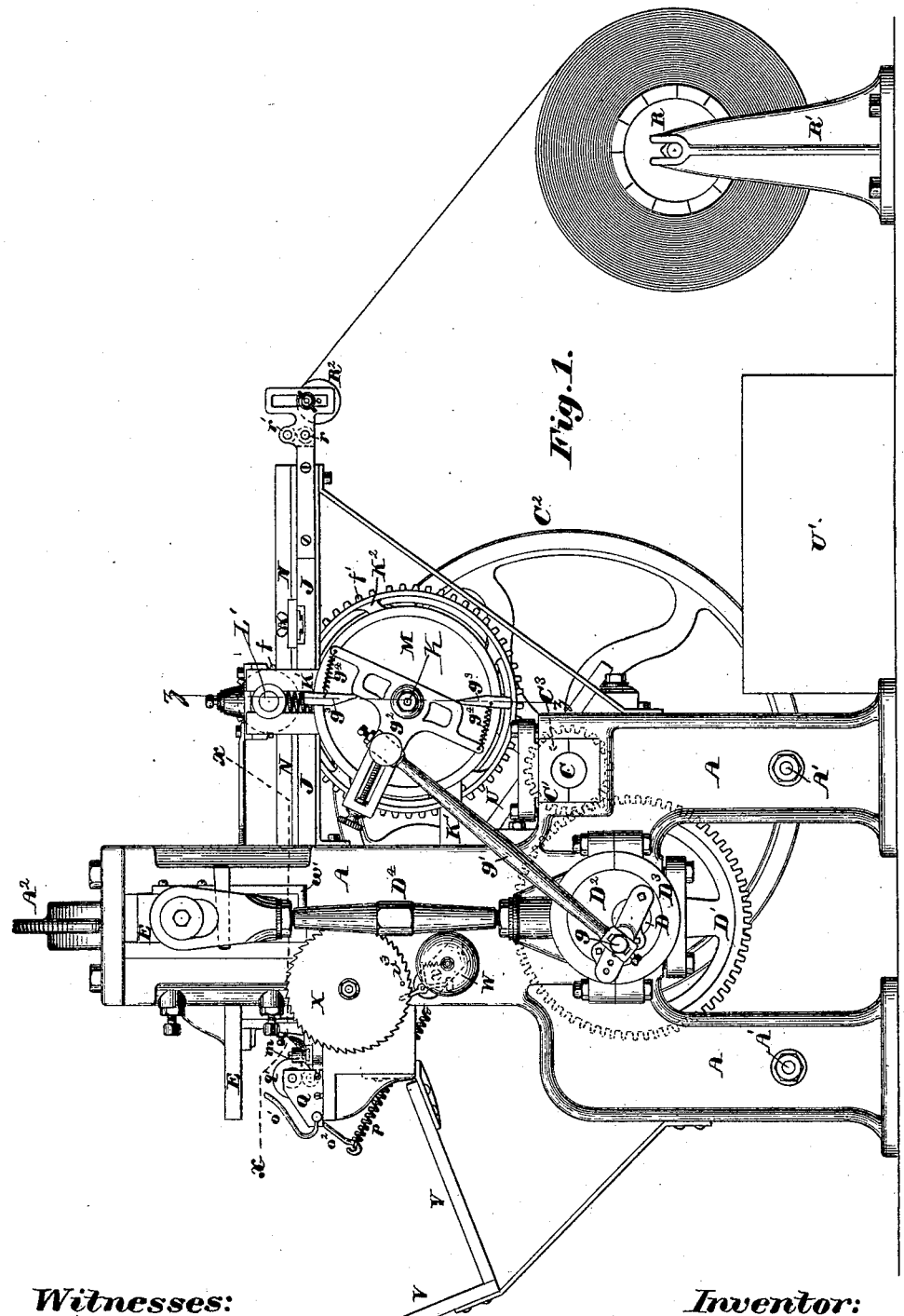
Figure 2:
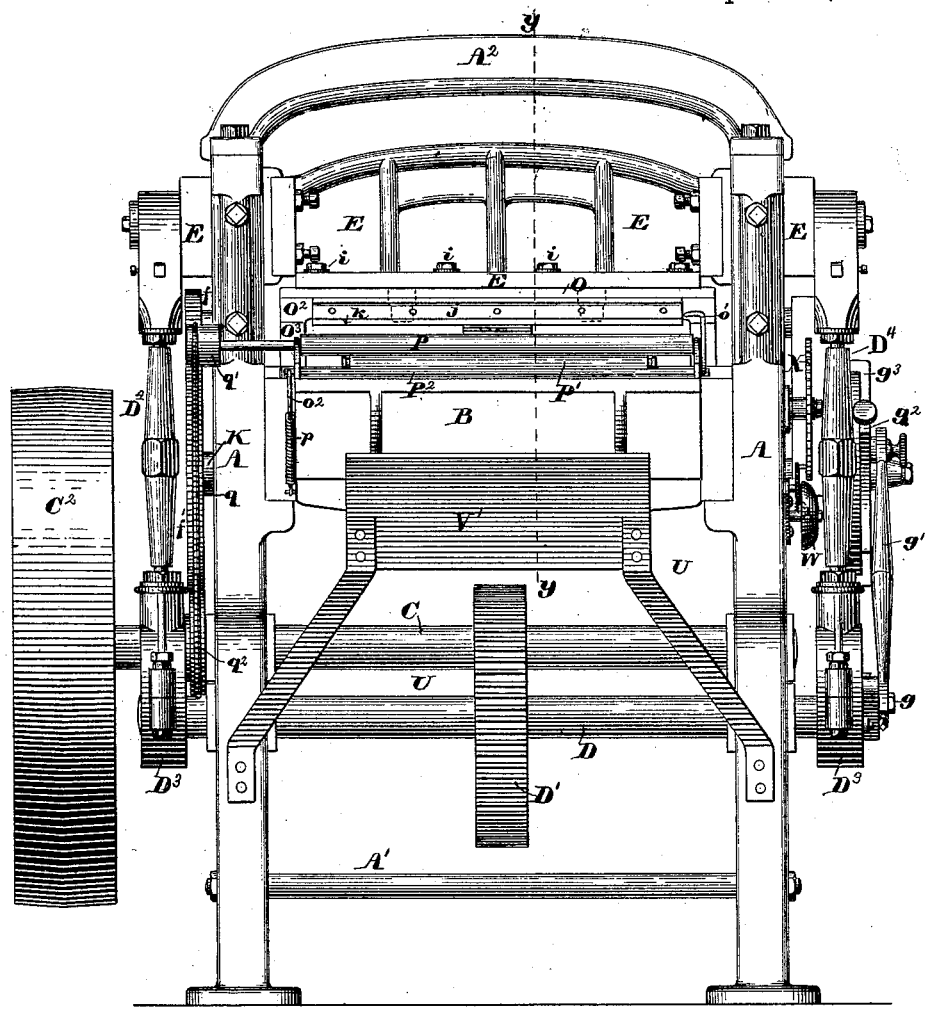
Figure 13:
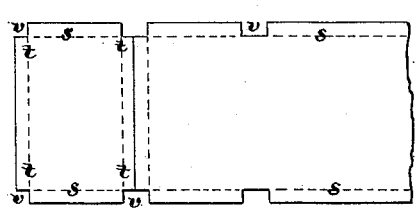
Figure 14:
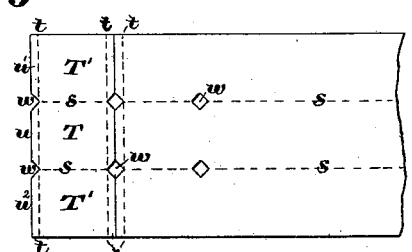
Figure 3:
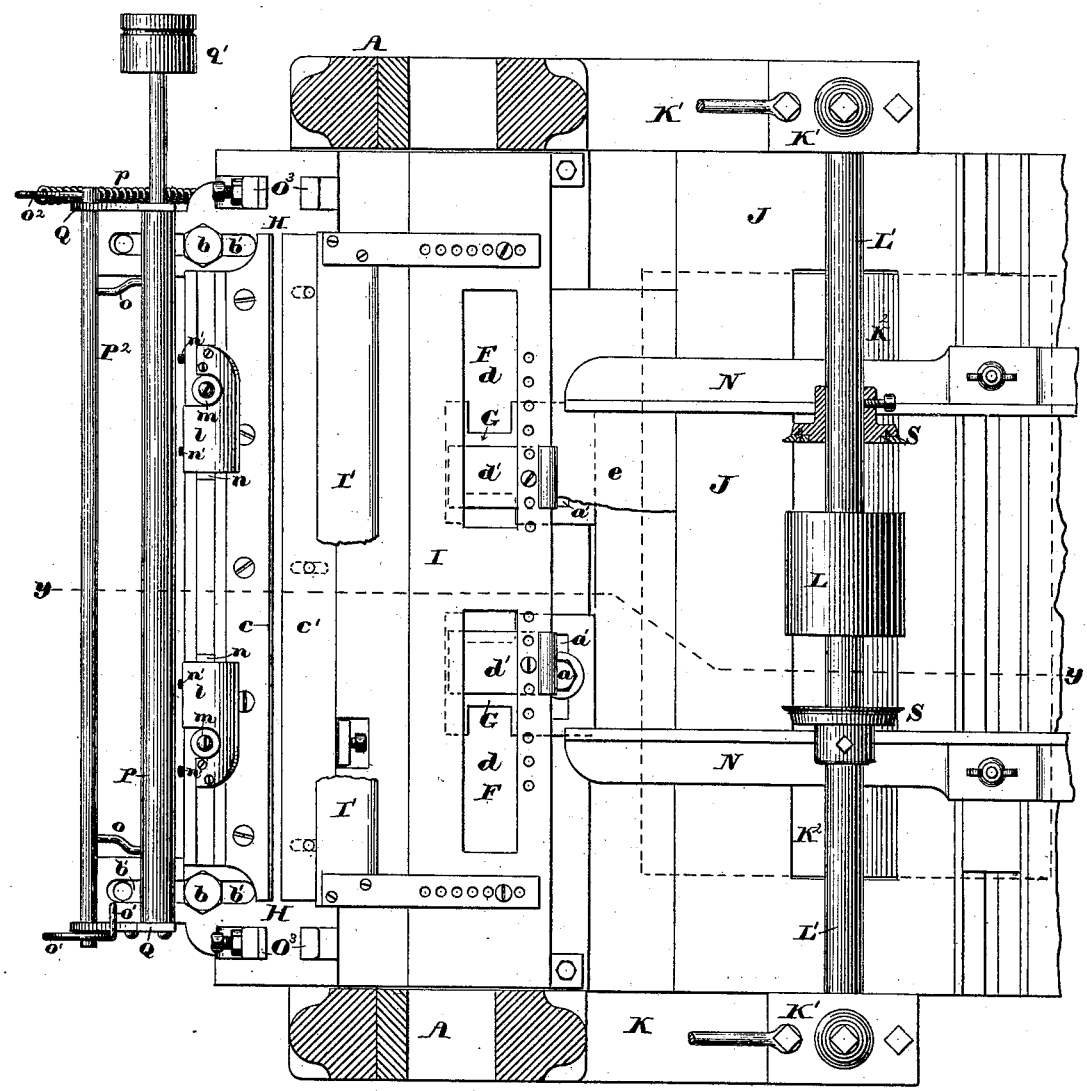
Figure 4:
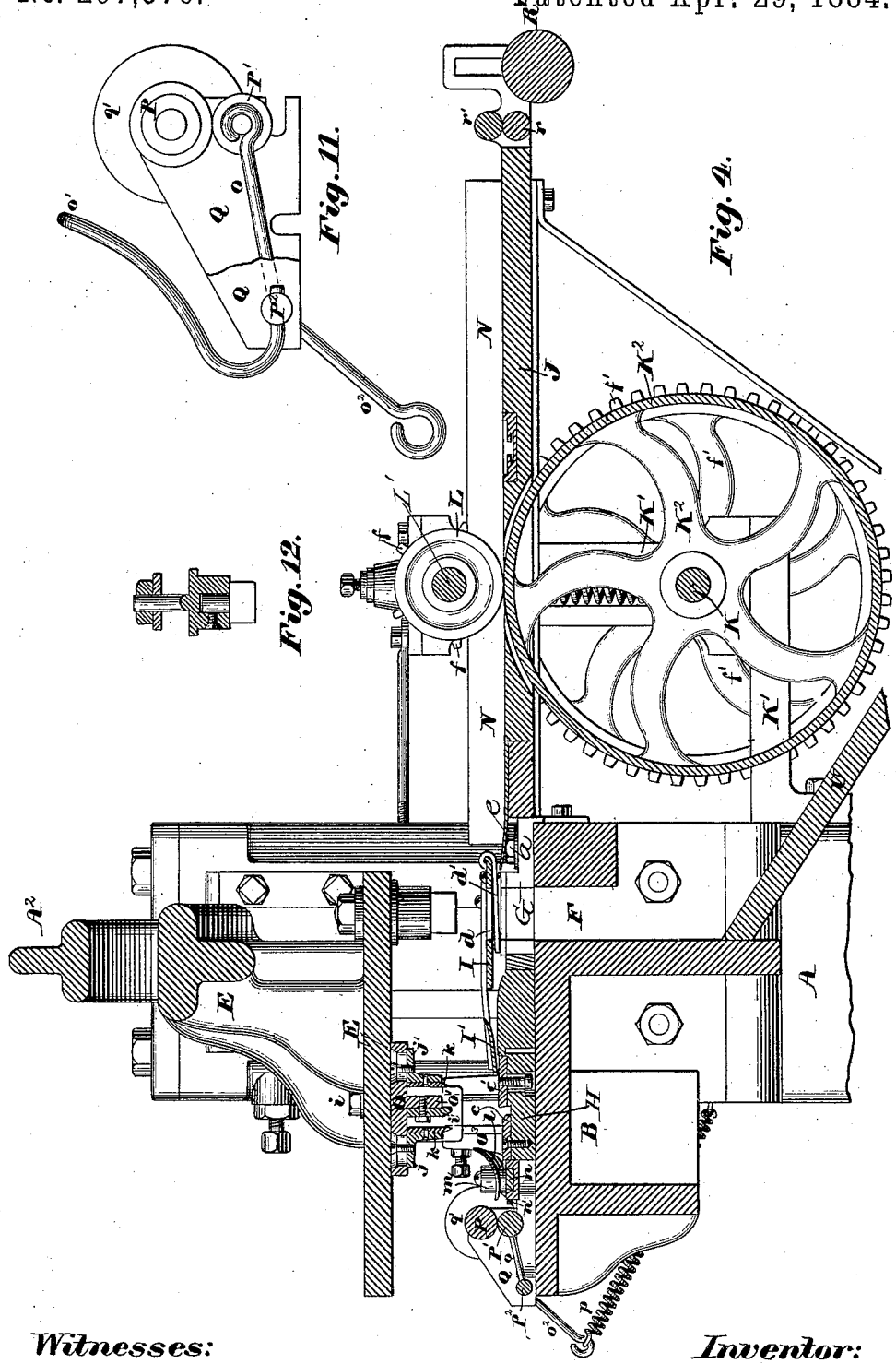
Figure 5:
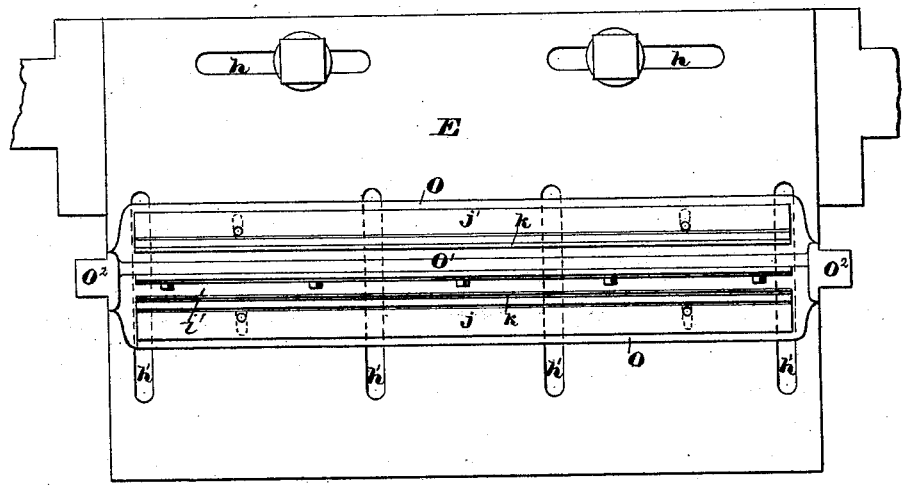
Figures 9, 10:
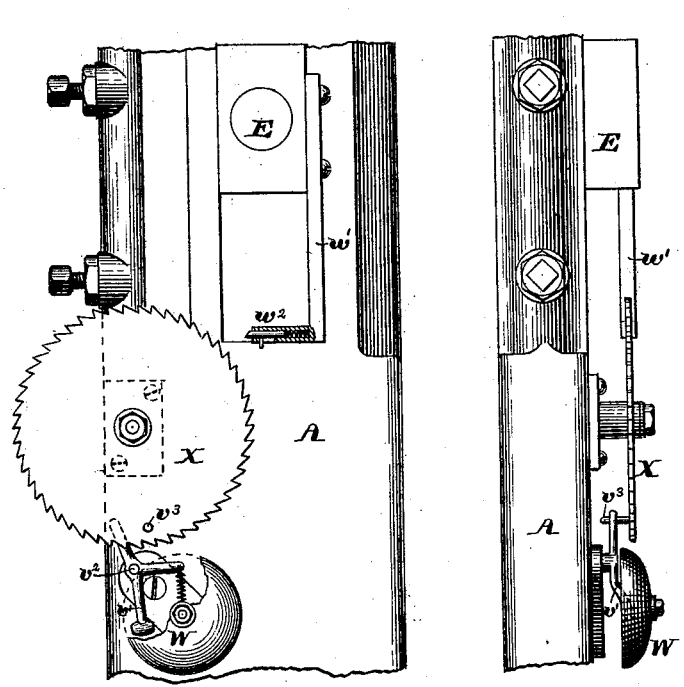
Figure 7:
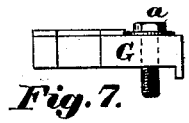
Figure 6:
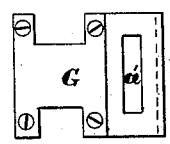
Figure 8:
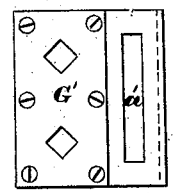
Figure 15:
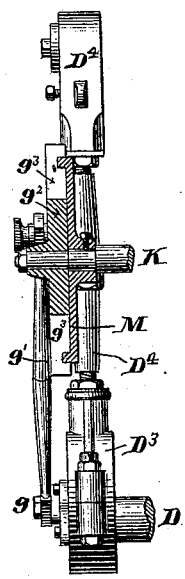

Figure 1 of the drawings is a side elevation of a machine embodying my invention. Fig. 2 is a front elevation of the same. Fig. 3 is a sectional plan enlarged, the cutting-plane being on line $x$ $x$ on Fig. 1. Fig. 4 is a vertical section on line $y$ $y$ on Figs. 2 and 3, drawn to an enlarged scale. Fig. 5 is an inverted plan of the cross-head and the movable cutting and creasing dies. Figs. 6 and 7 are respectively a plan and an edge view of the female corner-cutting dies. Fig. 8 is a plan of a modified form of the corner-cutting female die. Figs. 9 and 10 are respectively a side elevation and an edge view of the counting mechanism. Fig. 11 is an elevation of the discharge feed-rolls, with a portion of one of the stands broken away, the same being drawn to an enlarged scale. Fig. 12 is a detail illustrating the construction of the male corner-cutting dies, drawn to the same scale as Fig. 4. Fig. 13 is a plan of a portion of a strip of straw-board and a single blank cut therefrom; and Fig. 14 is a similar view, showing another form of blank. Fig. 15 is a vertical section of the feed-disk and grip-operating lever on line $z$ $z$ on Fig. 1.

A A are the side frames of the machine, connected together by the tie-rods A' A', the girt A², and the bed B.

C is the driving-shaft, mounted in boxes C', and having secured thereon the fly-wheel C² and the spur-pinion C³, (shown only in dotted lines in Fig. 1.) The pinion C³ engages with and imparts motion to the spur-gear wheel D', firmly secured upon the shaft D, which is mounted in bearings in the frames A, and has firmly secured upon each end thereof, outside of the frames A, an eccentric, D², the strap D³ of which is connected by the adjustable rod D⁴ to one end of the cross-head E, as shown. The cross-head E is fitted to slide vertically in slots or guideways formed for the purpose in the upper ends of the frames A, which slots are closed at their upper ends by the feet of the tie-girt A², as shown in Fig. 1. The die-supporting bed B has formed therein long rectangular slots F, immediately above which are adjustably secured to said table or bed the female cutting-dies G or G', according to the style of blank to be cut. The dies G or G' are secured to said bed B by bolts $a$, which pass through slots $a'$ in said dies, and screw into the bed B in such a manner that they may be adjusted toward and from each other or transversely of the line of feed of the strip of straw-board, for the purpose of adapting them to different sizes of blanks.

H is a die-plate secured in position on the bed B by bolts $b$ $b$, which pass through slots $b'$ $b'$, formed in said plate, and screw into the bed B in such a manner that said plate may be adjusted toward and from the front of the machine for the purpose of varying the width of the blank cut. Upon the upper surface of the plate H are secured the two plates $c$ and $c'$, the former in a fixed position, and the latter so as to be adjusted toward and from the front of the machine to compensate for the wear of said plate in sharpening, the front edge of said plate serving as the stationary cutter for severing the blank from the strip, and also as a bed upon which the material rests while the line of fold is being embossed or pressed therein, the plate $c$ also serving as an embossing-bed, as will be described.

I and I' are clearer-plates, arranged above the dies G or G' and the plate $c'$, for the purpose of preventing the material from being lifted by the movable dies after being cut through thereby. The plate I has cut through it two rectangular slots, $d$ $d$, and has secured to its rear edge the adjustable spring-plates $d'$ $d'$, which project across said slots so as to act upon the straw-board in near proximity to the corner-cutting dies. A table, J, extends to the rear from the bed B, with its upper surface on a level, or nearly so, with the upper surfaces of the female corner-cutting dies G, and has secured to its upper surface, at its front edge, the thin plate e, the front edge of which overlaps said dies G, so as to insure the feeding of the straw-board over said dies without catching thereon.

K is a shaft mounted in bearings supported by the brackets K', and having secured thereon the feed-drum K², the upper surface of which projects through the table J, as shown in Figs. 3 and 4, and co-operates with the smaller feed-roll L, mounted upon the shaft L', to feed the web of material to the machine, said feed-drum and roll being made to revolve in unison by means of the spur-gear wheels $f$ and $f'$. An intermittent rotary motion is imparted to the feed-drum K² and roll L by means of the adjustable crank-pin $g$, mounted upon the end of the shaft D, the connecting-rod $g'$, the three-armed lever $g^2$, mounted loosely upon the shaft K, the wheel M, firmly secured upon said shaft K, the grip-pawls $g^3$, each provided with a notch to engage the rim of said wheel, and the springs $g^4$, interposed between said pawls and the lever $g^2$, and adapted to cause said pawls to grip the rim of said wheel when the lever $g^2$ is moved in one direction, and to release said grip when the lever is moved in the opposite direction.

N N are adjustable gages for guiding the web or strip of material to the dies in an obvious manner. The base-flange of the cross-head E is planed upon its under side, and has formed therein the two longitudinal slots $h\ h$, and two or more transverse slots $h'\ h'$, to facilitate the securing of the male cutting and creasing dies thereon and adjusting the same. The male corner-cutting dies are constructed substantially as illustrated in Fig. 12, and applied to the cross-head through the slots $h\ h$, and may be set with two of their sides parallel with the sides of the machine and to the line of feed of the material, or they may be set with all their sides at angles of forty-five degrees to said line of feed, according to the style of blank that is to be cut.

O is a plate provided with the downwardly-projecting rib O', and adjustably secured to the under side of the cross-head E by means of the bolts $i\ i$, which pass through the slots $h'\ h'$ and screw into the plate O. To the rib O' is secured the cutter-blade $i'$, having its lever-edge so shaped as to produce a drawing cut upon the material when the cross-head E descends and said blade comes in contact with said material. To the under side of the plate O are secured two angle-iron bars, $j\ j'$, in such a manner that they may be adjusted toward and from the cutter-blade $i'$, and each has secured thereon a steel blade, $k\ k$, having a thin rounded edge, which operates upon the material to emboss thereon one of the lines of fold at each descent of the cross-head E. The plate O has formed upon each end thereof a rectangular guide-block, O², which fits into and moves up and down in a slotted guide-stand, O³, which is cast with or bolted to and projects upward from the die-plate H, and is adjustable therewith. By thus connecting the stationary and movable cutting-off blades they may be readily adjusted to a greater or less distance from the corner-cutting dies, for the purpose of varying the width of the blank to be cut without changing the relative positions of the fixed and moving cutting-blades, which is a great advantage in saving of time in making the adjustments. Two curved guiding and directing plates, $l$, with two guide-rolls, $m$, are mounted upon two bars, $n$, which are fitted to and adjustably secured by set-screw $n'\ n'$ in a groove formed for the purpose in the front portion of the die-plate H, or in a separate plate connected thereto and adjustable therewith.

P and P' are a pair of delivery-rolls, located just in front of the cutting-off and embossing blades, for the purpose of discharging the blank after it is severed from the web. The roll P is mounted in fixed bearings in the plates or stands Q, which are secured to the die-plate H, and is adjustable therewith. The roll P' is mounted in bearings in the ends of the arms $o\ o$, which radiate from the rocker-shaft P², which is also mounted in bearings in the stands Q, and is provided with the arms $o'$ and $o^2$, for the purpose of operating said shaft to move the roll P' toward and from the roll P, the construction and arrangement of these parts being clearly shown in Fig. 11. The roll P' is forced into contact with the roll P by the spring $p$, connected at one end to the arm $o^2$, and at its other end to some fixed portion of the machine; and said roll P' is moved away from the roll P, thereby stopping the action of said roll upon the material, while the cutting and embossing dies are operating thereon, by the cross-head E coming in contact with the upper end of the arm $o'$. The roll P is revolved by the belt $q$ and pulleys $q'$ and $q^2$ at a speed considerably greater than the speed of the feed-drum K² and feed-roll L, so as to carry the severed blank quickly away from the advancing web of material. The straw-board which I use is manufactured in the roll, and is fed continuously to the cutting and creasing tools, said roll of straw-board being wound upon the shaft R, which is mounted in bearings in the stands R', only one of which is shown, and passing over the rolls R² and $r$, and beneath the roll $r'$ is seized and fed forward to the cutting-dies by the drum K² and roll L a given and predetermined distance at each revolution of the eccentric-shaft D. The length of material fed at each revolution, as above described, may be varied at will by adjusting the connecting-rod $g'$ to a greater or less distance from the axis of motion of the lever $g^2$, or changing the crank-pin $g$ to a greater or less distance from the axis of the shaft D.

Upon the shaft L' are adjustably secured two creasing-disks, S S, one upon each side of the roll L, and arranged to press upon the material as it is fed forward, and form therein the two lines of fold *s s*. (Shown in Figs. 13 and 14.) The blank shown in Fig. 13, when the portions outside of the dotted lines *s s* and *t t* are turned up at right angles to the central portion of the blank, and the ends of the turned-up portions are secured together in the usual way, forms a box-cover or a shallow box, and a box may be made of any desired depth by cutting those portions of the blank which are outside of the lines *s s* and *t t* of a width corresponding to the desired depth to be given to the box. The blank shown in Fig. 14 forms the bottom T and two ends, T', of a box, the two sides to be cut separately and secured by paste, glue, or other adhesive material to the flaps $u$, $u'$, and $u^2$, after they are bent at right angles to the parts T and T'.

When the material is fed to the machine, the first descent of the cross-head E causes the corner-cutting dies to cut two rectangular notches, *v v*, in the edge of the web or strip of material, or two rectangular perforations, *w w*, in the body of the material, according to the kind of blank being made. At the next descent of the cross-head two more notches or perforations will be cut. The material will be cut or trimmed through the centers of the previously-formed notches or perforations, and two lines of fold, *t t*, will be embossed upon the material, one at each side of the line of cut, and so the operation may be repeated indefinitely, so long as the material is supplied to the dies. The waste punched out in cutting the notches *v v* or holes *w w* falls upon the inclined plane U and slides into the box U', and the blanks, when they are severed from the web, are suddenly discharged by the rolls P and P', and fall upon the inclined plane V at the front of the machine and rest against the abutment V' until removed by the operator, which is usually done after every fiftieth or hundredth blank has fallen upon the pile.

To determine accurately the proper time for removing the blanks, a counting apparatus is applied to the machine, as follows: A bell, W, is mounted upon a suitable support secured to the side of one of the frames A, and provided with a spring-actuated hammer, $v'$, pivoted at $v^2$, as shown in Figs. 9 and 10. A disk-wheel, X, provided upon its periphery with fifty teeth, is mounted upon a suitable journal above said bell, and has set therein, so as to project inward therefrom and move in a path in which lies the upper end of the lever of the hammer $v'$, a pin, $v^3$. To the end of the cross-head E is bolted the downwardly-projecting bent arm $w'$, in the horizontal arm of which is set the spring-pressed yielding pawl $w^2$, which, at each descent of the cross-head E, engages with a tooth of the wheel X, and moves it a distance equal to the length of a tooth, and when said cross-head and pawl-arm rises the pawl $w^2$ yields, so as to pass the tooth of the wheel without turning it. At each revolution of the wheel X the pin $v^3$ engages with the handle of the hammer $v'$ to move it about its axis and strain the spring attached thereto, and when the pin has passed said handle or lever the reaction of said spring causes the hammer $v'$ to strike a smart blow upon the bell, and notify the operator that fifty blanks have been deposited upon the inclined plane V.

What I claim as new, and desire to secure by Letters Patent of the United States, is—

1. In a machine for cutting straw-board for making paper boxes, the combination of two pairs of rectangular male and female dies for cutting the corners of the box-blank, a pair of severing-dies arranged to be adjusted toward and from the corner-cutting dies, and two crease-embossing blades arranged upon opposite sides of said severing-dies, and adapted to be adjusted toward and from said severing-dies, substantially as and for the purposes described.

2. In combination with the fixed bed B and vertically-reciprocating cross-head E, the die-plate H, having adjustably secured thereon the stationary cutting-die $c'$, and, firmly secured thereto in fixed positions, the slotted stand $O^3$, and the plate O, carrying the cutter blade or die $i'$, and provided with the rectangular guide-blocks $O^2$, and adjustably secured to the cross-head E, all substantially as and for the purposes described.

3. The plate O, adjustably secured upon the cross-head E, and having firmly secured thereon the cutting-die $i'$, and the two crease or fold embossing-blades *k k*, bolted to the under side of said plate O, and arranged to be adjusted thereon toward or from the cutting-die $i'$, all arranged and adapted to operate substantially as and for the purposes described.

4. The combination of two pairs of corner-cutting dies, arranged to be adjusted in a direction at right angles to the line of feed of the material, a pair of severing-dies or cutters arranged to be adjusted in a direction parallel with the line of feed of the material, and a pair of embossing-blades arranged upon opposite sides of and parallel to the movable severing-die, and to be adjusted toward and from said severing-die, substantially as described.

5. In combination with the vertically-reciprocating cross-head E and the severing and embossing dies, the delivery-roll P, mounted in fixed bearings, the shaft $P^2$, provided with the arms *o o*, $o'$, and $o^2$, the spring $p$, and the roll P', mounted in bearings in the movable ends of the arms *o o*, substantially as and for the purposes described.

In testimony whereof I have signed my name to this specification, in the presence of two subscribing witnesses, on this 7th day of June, A. D. 1883.

GEO. H. DICKERMAN.

Witnesses:
N. C. LOMBARD,
WALTER E. LOMBARD.